United States Patent [19]

Braybrook et al.

[11] Patent Number: 5,278,266

[45] Date of Patent: Jan. 11, 1994

[54] SYNTHESIS OF POLY(VINYL PHOSPHONIC ACID)

[75] Inventors: Julian H. Braybrook, Epsom; John Ellis, Duffield, both of England

[73] Assignee: British Technology Group Limited, London, England

[21] Appl. No.: 831,578

[22] Filed: Feb. 5, 1992

[30] Foreign Application Priority Data

Feb. 6, 1991 [GB] United Kingdom ............ 9102501

[51] Int. Cl.$^5$ .................. C08F 8/12; C08F 30/02
[52] U.S. Cl. ............................. 526/204; 526/208; 526/278; 526/219.6; 525/326.6; 523/168
[58] Field of Search ........ 526/278, 204, 208, 219.6; 525/326.6

[56] References Cited

U.S. PATENT DOCUMENTS

| | | | |
|---|---|---|---|
| 3,297,663 | 1/1967 | Herbst et al. | 526/278 X |
| 3,576,793 | 4/1971 | Carroll et al. | 526/278 |
| 3,943,074 | 3/1976 | Dulog | 526/278 X |
| 4,537,940 | 8/1985 | Omura et al. | 526/278 |
| 4,696,987 | 9/1987 | Dürsch et al. | 526/216 |
| 4,822,861 | 4/1989 | Rowe et al. | 525/355 |
| 5,077,366 | 12/1991 | McEwen et al. | 526/278 |

FOREIGN PATENT DOCUMENTS

| | | |
|---|---|---|
| 0114394 | 7/1984 | European Pat. Off. |
| 0340016 | 1/1989 | European Pat. Off. |
| 2090265A | 10/1982 | United Kingdom |

Primary Examiner—Joseph L. Schofer
Assistant Examiner—Mark Nagumo
Attorney, Agent, or Firm—Nixon & Vanderhye

[57] ABSTRACT

Poly(vinyl phosphonic acid) is synthesized by polymerizing vinyl phosphonyl dichloride in the presence of a cross-linker such as formaldehyde or 1,3-butadiene diepoxide, with a free-radical initiator. The product can be reacted with aluminosilicate glass to form an improved cement.

9 Claims, No Drawings

SYNTHESIS OF POLY(VINYL PHOSPHONIC ACID)

This invention relates to a method of synthesising poly(vinyl phosphonic acid), PVPA, especially with a view to obtaining a product of high molecular weight or a product which will yield strong glass ionomer cements.

A known synthesis of PVPA is disclosed in European Patent Application Publication 340016, and is as follows:

The first stage is the preparation of a polymer of vinyl phosphonic acid from vinyl phosphonyl dichloride (VPDC). VPDC is dissolved in an equal volume of 1,1,1-trichloroethane and to this solution is added the initiator, azo-bis-isobutyronitrile, at a level of 3% by weight of the monomer. The mixture is heated under nitrogen, with stirring, in a water-jacketed reaction vessel equipped with a reflux condenser to a temperature of 70° C. for two hours. If the entire polymerisation (18 hours) were carried out at 70° C., the yield would be 50-60%. Instead, after two hours at 70° C., the temperature is lowered to 40°-45° C. and maintained at this temperature for a further 16-18 hours, whereby the yield is increased to 85-90%.

A viscous, orange-brown solution results, which is a solution of the crude polymer of vinyl phosphonyl dichloride. This is then hydrolysed by slow addition into a large volume of chilled water with stirring, removing the bulk of the HCl gas as it is formed by means of a vacuum. The hydrolysed product is then concentrated, and the excess organic solvent removed by vacuum distillation or by means of a rotary evaporator.

Analysis of the product typically shows it to contain 85-90% of the desired PVPA - poly(vinyl phosphonic acid), a solid, together with some 10-15% residual monomer.

The next stage is the purification of the product prepared as just described. The PVPA must first be isolated by removing the water introduced by the hydrolysis, using a rotary evaporator or similar. The resulting solid is then dissolved in an equal or lesser weight of industrial methylated spirits (other alcohols can be used) with gentle warming as necessary. The solution is then poured slowly into a large excess of a non-solvent, such as ethyl acetate, with stirring. A white precipitate forms, which is isolated from the solvent mixture, and contains some 5% of residual monomer. Repeating the dissolution in industrial methylated spirits and the precipitation with ethyl acetate leaves no residual monomer detectable by P-31 NMR spectroscopy.

The purified PVPA is a hygroscopic, off-white solid. It is readily soluble in water up to concentrations greater than 80% by weight when prepared as described. It has been suggested that a higher molecular weight than obtained by that method would be desirable to realise the potential advantages of PVPA glass ionomer cements over current commercial polyacrylic acid glass ionomer cements, such as increased strength and improved handling properties and aesthetics of such cements.

According to the present invention, a method of synthesising poly(vinyl phosphonic acid), which may be substituted, comprises polymerising a vinyl phosphonyl compound, characterised in that the polymerisation takes place in the presence of a product-modifying additive, such as a cross-linker. Preferably the polymerisation takes place in an aqueous medium and preferably the additive is water-soluble. Preferably the polymerisation is free-radical polymerisation, for which the initiator is preferably azo-bis-iso-butyronitrile. Preferably the vinyl phosphonyl compound is a dihalide such as dichloride.

Preferably the additive has at least one reactive end group e.g. consisting of a chalcogenide, preferably either (i) double-bonded to an atom lacking any —OH group bonded thereto (for example =O, as in $R^1R^2C=O$ where neither R is —OH) or (ii) bonded to two themselves bonded atoms (for example

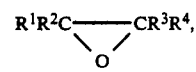

where preferably no R is —OH) such as an aldehyde (e.g. formaldehyde $H_2C=O$, paraformaldehyde $-(-CH_2O-)-_n$ (or glutaraldehyde $OCH(CH_2)_3CHO$), 1,3-butadiene di-epoxide

2,2'-sulphonyl diethanol

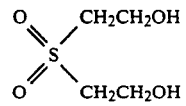

and ethylene glycol dimethacrylate

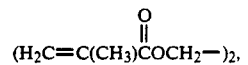

of which formaldehyde and 1,3-butadiene di-epoxide are most preferred and may be present in a proportion of 1-5% by mass of the vinyl phosphonyl compound.

The invention will now be described by way of example.

In each Example, 3% by mass of an additive was added under dry nitrogen to a degassed sample of vinyl phosphonyl dichloride in an equal volume of 1,1,1-trichloroethane as solvent. Immediately afterwards, azo-bis-iso-butyro-nitrile was added as initiator of the process of free radical polymerisation of vinyl phosphonyl dichloride. After polymerisation, the product was spray-dried to a powder. Samples of the polymer so obtained were found, by viscometry, to have mostly a higher molecular weight than the product of EP-A-340016.

After polymerisation, the product was made into a 50% by mass aqueous solution containing additionally 10% by mass of amino-tris(methyl phosphonic acid) (sold under the trade mark Dequest 2000 by Monsanto), to which mixture 3g ion-leachable aluminosilicate glass powder were added per 1 ml of liquid, thoroughly mixed and packed into a 6 mm×4 mm mould. The glass had been prepared by mixing together 437 parts by weight silica, 230 parts by weight alumina, 129 parts by weight calcium fluoride, 175 parts by weight cryolite and 29 parts by weight aluminium phosphate and heating to 1300° C. for 90 minutes. The melt was cooled rapidly by pouring into water. The resulting glass was ground and sieved, and the fraction of particle size less than 45 microns used to prepare the cement. Before use, the glass powder was deactivated by heating in a furnace at 450° C. for 90 minutes.

The "Dequest" improved the handling properties of the glass/PVPA cement system, and increased both the working time and strength of the cement.

The compressive strength of the resulting cement was determined after storage at 100% relative humidity at 37° C. for 24 hours, as shown in the following table. Storage under water yielded less impressive results, which however were still as good as or better than without the additive. The additive did not affect the handling properties of the glass/PVPA system.

The additive in each Example was as follows, and had the effect shown on cement setting time and working time and on compressive strength:

| Example | Additive | Working Time | Setting Time | Compressive Strength |
|---------|----------|--------------|--------------|----------------------|
| 1 | formaldehyde | 2½ min | 5½ min | 131.7 MPa (Standard Deviation 8.8) |
| 2 | 1,3-butadiene diepoxide (=1,2,3,4-diepoxybutane) | 2 min | 5 min | 121.0 MPa (11.5) |
| 3 | 2,2'-sulphonyl diethanol (=2-hydroxyethyl sulphone) | — | — | 115.6 MPa (15.0) |
| 4 | ethylene glycol dimethacrylate | — | — | 112.4 MPa (22.4) |
| 5 | paraformaldehyde | — | — | 110.7 MPa (6.4) |
| 6 | glutaraldehyde | — | — | 86.8 MPa (6.4) |
| Comparative | no additive | 2½ min | 5½ min | 91.1 MPa (3.6) |
| Comparative | 1,3-dichloropropan-2-ol | — | — | 73.2 MPa (5.6) |

Water-stability immediately after setting was good.

What is claimed is:

1. A method of synthesizing poly(vinylphosphonic acid), said method comprising the steps of:
    dissolving a vinylphosphonyl compound and an additive in any order in a solvent, said additive being selected from the group consisting of an aldehyde and an epoxide,
    thereafter adding a polymerization initiator,
    allowing polymerization to proceed to produce a polymerization product, and
    hydrolyzing said polymerization product to produce poly(vinylphosphonic acid).

2. A method according to claim 1, wherein the polymerization takes place in an aqueous medium.

3. A method according to claim 2, wherein the additive is water-soluble.

4. A method according to claim 2, wherein the polymerization is free-radical polymerization.

5. A method according to claim 4, wherein the polymerization initiator is azo-bis-iso-butyronitrile.

6. A method according to claim 1, wherein the vinyl phosphonyl compound is a dihalide.

7. A method according to claim 1, wherein the additive is formaldehyde.

8. A method according to claim 1, wherein the additive is 1,3-butadiene di-epoxide.

9. A method according to claim 1, wherein the additive is present in a proportion of 1-5% by mass of the vinyl phosphonyl compound.

* * * * *